(12) United States Patent
Buch et al.

(10) Patent No.: US 7,694,161 B2
(45) Date of Patent: Apr. 6, 2010

(54) UNCORE THERMAL MANAGEMENT

(75) Inventors: Deep Buch, Folsom, CA (US); Vivek Garg, Folsom, CA (US); Subramaniam Maiyuran, Goldriver, CA (US)

(73) Assignee: Intel Corporation, Santa Clara, CA (US)

( * ) Notice: Subject to any disclaimer, the term of this patent is extended or adjusted under 35 U.S.C. 154(b) by 826 days.

(21) Appl. No.: 11/479,408

(22) Filed: Jun. 30, 2006

(65) Prior Publication Data

US 2008/0005603 A1    Jan. 3, 2008

(51) Int. Cl.
*G06F 1/32* (2006.01)
(52) U.S. Cl. .................... 713/324; 713/323; 714/48
(58) Field of Classification Search .......... 713/300, 713/323, 324; 714/48
See application file for complete search history.

(56) References Cited

U.S. PATENT DOCUMENTS

| | | | |
|---|---|---|---|
| 6,009,488 A | 12/1999 | Kavipurapu | |
| 6,363,490 B1 * | 3/2002 | Senyk | 713/300 |
| 6,564,288 B2 * | 5/2003 | Olarig et al. | 711/105 |
| 7,085,940 B2 * | 8/2006 | Luick | 713/300 |
| 7,386,737 B2 * | 6/2008 | Finkelstein et al. | 713/300 |
| 7,472,292 B2 * | 12/2008 | Winick et al. | 713/300 |

* cited by examiner

*Primary Examiner*—Thuan N Du
(74) *Attorney, Agent, or Firm*—Blakely, Sokoloff, Taylor & Zafman LLP

(57) ABSTRACT

A method is described that involves controlling the traffic levels through an uncore to provide thermal management for the uncore. The method including determining if an uncore's temperature in a first uncore state is above a first threshold value and changing the first uncore state to a second uncore state if the uncore temperature is above the first threshold value.

13 Claims, 6 Drawing Sheets

UNCORE THERMAL MANAGEMENT

FIELD OF INVENTION

The field of invention relates to the computer sciences, generally, and, more specifically, to the thermal management of components other than a processing core.

BACKGROUND

Computing systems have traditionally been designed with a bus (such as a "front-side bus") between their processors and memory controller(s). High end computing systems typically include more than one processor so as to effectively increase the processing power of the computing system as a whole. Unfortunately, in computing systems where a single front-side bus connects multiple processors and a memory controller together, if two components that are connected to the bus transfer data/instructions between one another, then, all the other components that are connected to the bus must be "quiet" so as to not interfere with the transfer.

For instance, if four processors and a memory controller are connected to the same front-side bus, and, if a first processor transfers data or instructions to a second processor on the bus, then, the other two processors and the memory controller are forbidden from engaging in any kind of transfer on the bus. Bus structures also tend to have high capacitive loading which limits the maximum speed at which such transfers can be made. For these reasons, a front-side bus tends to act as a bottleneck within various computing systems and in multi-processor computing systems in particular.

In recent years computing system designers have begun to embrace the notion of replacing the front-side bus with a network or router. One approach is to replace the front-side bus with a router having point-to-point links (or interconnects) between each one of processors through the network and memory controller(s). The presence of the router permits simultaneous data/instruction exchanges between different pairs of communicating components that are coupled to the network. For example, a first processor and memory controller could be involved in a data/instruction transfer during the same time period in which second and third processors are involved in a data/instruction transfer.

Computer components, including processor cores, memory, interconnects, etc., suffer performance degradation or functional failure, when exposed to excessive thermal conditions. For example, a processor core may not perform tasks correctly or perform tasks at a slower rate if it is too hot. Accordingly, central processor unit (CPU) silicon typically includes a mechanism to control the temperature of the processing core(s) by turning the processing core's clock on/off, changing the clock frequency, and/or changing the core voltage.

Likewise, memory controllers typically include logic that is used to protect the memory (such as Random Access Memory (RAM)) accessed by the memory controllers from overheating. Generally, the number of reads and writes to the memory is restricted over a given time period as a way to control temperature. Alternatively, a thermal sensor on the memory DIMMs is utilized to monitor overheating conditions.

The remainder of the components in the computing system (such as the interconnection network, routing agents, caching agent and home agents) do not have any thermal protection even though these components also suffer performance degradation based on thermal conditions.

BRIEF DESCRIPTION OF THE DRAWING

The present invention is illustrated by way of example and not limitation in the figures of the accompanying drawings, in which like references indicate similar elements and in which.

DETAILED DESCRIPTION

Embodiments of the invention disclosed herein describe a thermal management technique that may be used in an electronic device, such as single core or multiple core microprocessors, or an electronics system, such a shared bus computer system or a point-to-point (P2P) bus computer system. More particularly, one embodiment of the invention describes an architecture, in which the thermal management of components other than processing cores and memory controllers may be provided by controlling the amount of traffic that flows through these components (the more traffic, the hotter the temperature). Advantageously, controlling the temperature of at least some of these other components provides for a more stable computing system.

Figure 1:
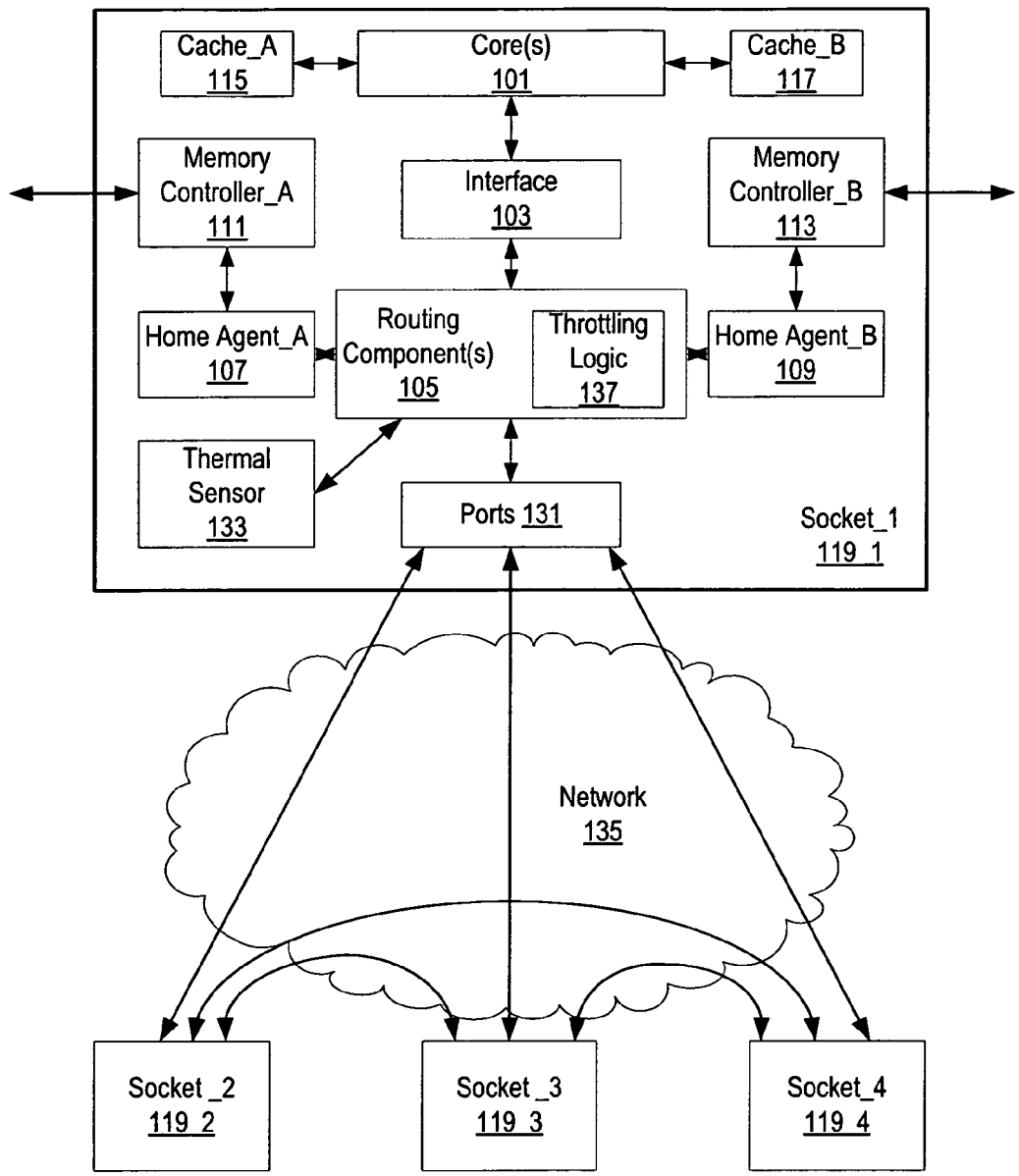
FIG. 1 illustrates an embodiment of a multiprocessor system according to an embodiment.

FIG. 1 illustrates an embodiment of a multiprocessor system according to an embodiment. A plurality of sockets or processors 119_1 to 119_4 communicate with one another through the use of a network 135. These sockets may also be referred to as caching agents.

Sockets 119_1 through 119_4 that are coupled to the network 135 are referred to as "sockets" because they can be viewed as being plugged into the computing system's network 135. One of these sockets, socket 119_1, is depicted in detail. Of course, the number of caches, cores, home agents, and memory controllers may be more or less than what is shown.

According to the depiction observed in FIG. 1, socket 119_1 is coupled to network 135 through bi-directional point-to-point links. In an implementation, each bi-directional point-to-point link is made from a pair of uni-directional point-to-point links that transmit information in opposite directions.

Socket_1 119_1 is shown in greater detail and includes at least one processing core 101 and cache 117, 115 associated with the core(s) 101. Routing components 105 connect the socket 119_1 to the external network 135 through ports 131 and provide a communication path between socket 119_1 and the other sockets connected to the network 135. In an embodiment, routing components 105 include a crossbar router. Network 135 is used to connect different sockets and may be a crossbar router.

A core interface 103 translates requests from the core(s) 101 into format acceptable for the routing components 105 and vice versa. For example, the core interface 103 may packetize data from the core for the routing component(s) 105 to transmit across the network. Of course, the core interface 103 may also depacketize transactions that come from the routing component(s) 105 so that the core(s) are able to understand the transactions.

At least a portion of the routing component(s) 105 communicates with home agents 107, 109. Home agents 107, 109 are a part of, or communicate with, the memory controllers 111, 113. These memory controllers 111, 113 are used to write and/or read data to/from memory devices such as Random Access Memory (RAM).

A home agent 107, 109 manages the cache coherency protocol utilized in a socket and accesses to the memory (using the memory controllers 111, 113 for some process requests). In one embodiment, the home agents 107, 109 include a table for holding pending cache snoops in the system. The home agent table contains the cache snoops that are pending in the system at the present time. The table holds at most one snoop for each socket 119_2 to 119_4 that sent a request (source caching agent). In an embodiment, the table is a group of registers wherein each register contains one request. The table may be of any size, such as 16 or 32 registers.

Home agents 107, 109 may also include a queue for holding requests or snoops that cannot be processed or sent at the present time. The queue allows for out-of-order processing of requests sequentially received. In an example embodiment, the queue is a buffer, such as a First-In-First-Out (FIFO) buffer.

The home agents 107, 109 may also include a directory of the information stored in all caches of the system. The directory need not be all-inclusive (e.g., the directory does not need to contain a list of exactly where every cached line is located in the system). Since a home agent 107, 109 services cache requests, the home agent 107, 109 must know where to direct snoops. In order for the home agent 107, 109 to direct snoops, it should have some ability to determine where requested information is stored. The directory is the component that helps the home agent 107, 109 determine where information in the cache of the system is stored. Home agents 107, 109 also receive update information from the other agents through the requests it receives and the responses it receives from source and destination agents or from a "master" home agent (not shown).

A credit or tracker based transaction scheme may also be implemented to control the flow of traffic through socket ports and the network. Each socket and/or port has an allocation of tracker (credit) resources available to it where the number of credits available dictates if the socket is able to send or receive packets. These credits are tracked at the home agent 107, 109.

Each port 131 includes separate regions of data link layer and physical layer circuitry. As is understood in the art, the physical layer of a network typically forms parallel-to-serial conversion, encoding and transmission functions in the outbound direction and, reception, decoding and serial-to-parallel conversion in the inbound direction.

That data link layer of a network is typically used to ensure the integrity of information being transmitted between points over a point-to-point link (e.g., with CRC code generation on the transmit side and CRC code checking on the receive side). Data link layer circuitry typically includes logic circuitry while physical layer circuitry may include a mixture of digital and mixed-signal (and/or analog) circuitry. Note that the combination of data-link layer and physical layer circuitry may be referred to as a Media Access Control (MAC) layer.

An "uncore" of a socket and/or computing system is typically those components that are not a part of the processing core. These components may include one or more of the following: one or more memory controllers, all or a portion of a network, and/or logic to interface with the router and core(s) such as routing components 105 and ports 131.

As illustrated, socket 119_1 (and/or each of the other sockets) has a thermal sensor 133. The thermal sensor 133 measures the temperature in the uncore. More specifically, the thermal sensor 133 measures the temperature in one or more of the following: ports 131, routing components 105, and/or network 135. The routing components 105 are the central entity or agent through which all the traffic flows for a socket and the network is the central entity or agent through which all the traffic flows between sockets and hence each offers itself as a location to support a myriad of throttling options.

Each socket may have its own throttling logic 137 that looks at the traffic flowing through the ports 131 and/or temperature of the ports 131 and/or routing components 105 to determine how much bandwidth should be allowed to pass through the socket. The throttling logic 137 controls the temperature of the uncore by changing (throttling) the available bandwidth of a socket. While throttling logic is shown as a part of the routing components 105, it may be placed outside of the routing components 105 but within the socket 119.

The throttling logic 137 may utilize a state machine with different states of uncore management. In an alternative embodiment, the routing components 105 store the state machine. Each successive state of the state machine further throttles or limits the traffic that may pass into or from a socket through the routing components 105 and/or network 135.

In an alternative embodiment, the throttling logic 137 is placed in the network 135. Temperature readings are shared with the throttling logic 137 of the network 135. The throttling logic 137 may communicate to a socket in several different ways. Throttling logic may: 1) communicate through ports 131 to the routing components 105; 2) have a direct connection to the routing components 105; or 3) have a connection through the thermal sensor 133.

For example, if the throttling logic 137 receives readings from thermal sensor 133 that port connecting socket 119_1 to socket 119_2 is too hot (and therefore has an increased risk of failure), the throttling logic 137 notifies socket 119_1 and/or 119_2 to decrease the amount of traffic appearing on their respective ports.

In an embodiment, the computing system utilizes virtual networks to provide for the state values by describing the functionality of links (how much traffic may pass through the links.) At initialization of the computing system, each virtual network (or state) has a set number of credits allocated to it. Typically, these credits are allocated on the link layer and are necessary for one socket in order to send messages (packets) to another socket as described earlier. The availability of credits available to a socket may change dynamically over time (sockets may lend credits, credits may be taken away, credits may be borrowed, etc.). By controlling the availability of credit, traffic levels (and hence uncore temperature) are controllable. For example, by making states progressively worse (more constraints on traffic flow), any uncore temperature rise should slow down or retreat.

In an embodiment, the computing system utilizes a state machine with five states. At the initialization state or virtual network_0 (VN0), socket traffic is maximally buffered. In other words, each socket has its full number credits to work with without having to borrow from another socket. This state is the one that is typically used. In one embodiment, all credits not in use by a socket are placed in a pool for use by the other sockets. These credits may be used for any message class and will likely allow for multiple packets of each message class.

In the first state (state_1) or virtual network_1 (VN1), the traffic amount allowed to flow through a socket is less than that of the initial state. In other words, fewer credits are available to a socket. In an embodiment, the amount of traffic in this state is set at one message every N clock cycles (with N being some number).

The second state (state_2) or virtual network_2 (VN2) allows even less traffic than the first state. In one embodiment, only one packet worth of storage (one credit) is available for each message class in a socket.

In the third state (state_3) or virtual network_3 (VN3), all activity to and from a socket or sockets throughout the network is stopped and no credit is available to one or more of the sockets. Essentially, all activity in the respective routing component(s) 105 is halted making the ports 131 unavailable. This stop condition may be periodically turned off and on.

In the fourth state (shutdown state) or virtual network_4 (VN4), the power to one or more uncore components (such as the crossbar network 135, routing components 105, and/or ports 131) is cutoff.

Figure 2:
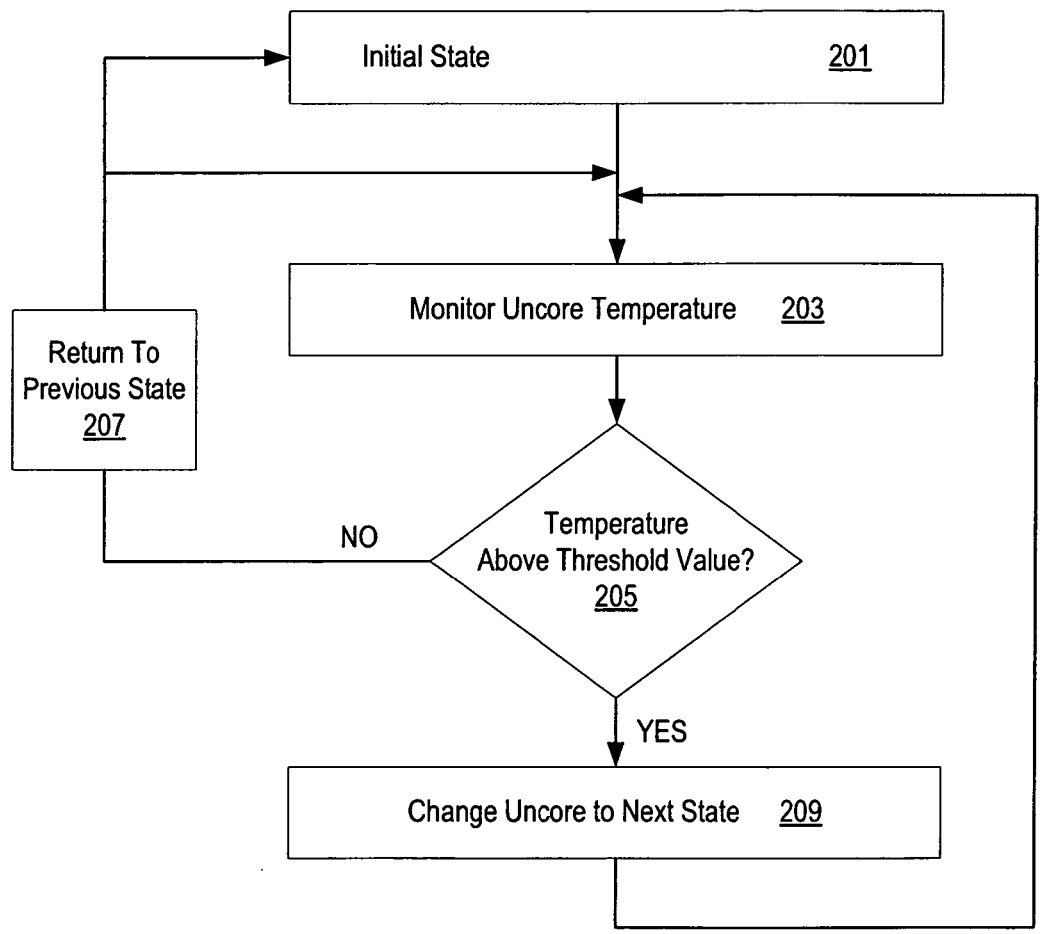
FIG. 2 illustrates an embodiment of a flow for uncore thermal management.

FIG. 2 illustrates an embodiment of a flow for uncore thermal management. The temperature of an uncore may be controlled by changing the state, and therefore the performance metrics, of the uncore. As described above, the uncore may include one or more of the following: one or more memory controllers, all or a portion of a network, and/or logic to interface with the router and core(s).

The uncore is placed in an initial state at 201. In the initial state, the uncore is operating under normal conditions with little to no restrictions on its operation. For example, each socket connected to the network is able to use its ports and links to full or near full capacity.

The temperature of the uncore is monitored at 203. The temperature of the uncore is taken by reading the value from thermal sensor placed near or in the uncore. The thermal sensor may be on-die or off-die. Monitoring of the uncore may occur periodically or on demand.

In one embodiment, an approximation for the temperature of the uncore is made by determining how many transactions have passed through the uncore in a set period. For example, if the uncore has been operating at full capacity for several minutes, the temperature of the uncore has probably risen. A table with approximate temperature versus traffic per period values may be generated prior to deployment of the system and used to determine the approximate uncore temperature value.

The temperature of the uncore is compared to a threshold value at 205. This comparison may be performed by the thermal sensor or by the thermal sensor and some additional logic. Additionally, the sensor may contain the threshold value or values for the comparison or storage outside of the sensor may be used (for example, a set of one or more registers). In an embodiment, the thermal sensor only has one threshold value to compare the uncore temperature too. In another embodiment, there are multiple threshold values, with each threshold value equated to a different uncore state. Throttle logic may have a liking of the threshold values instead of or in addition to the sensor.

If the temperate is above the threshold value, the state of the uncore is changed to the next state. As the uncore changes states, it loses some functionality and/or bandwidth to limit the traffic that passes through or is processed by the uncore. By limiting functionality and/or bandwidth, the uncore temperature may begin to cool down.

If the temperature is not above the threshold value, then the uncore will return to a previous state (unless the uncore was in the initial state, in which case the uncore remains in the initial state). For example, if the uncore was in a second state (for example, a state with very limited functionality and/or bandwidth) then it will return to the first state.

In an embodiment, the temperature of the uncore is compared to more than one threshold value at 205 and the uncore state changed accordingly. For example, the uncore may skip a state if the uncore temperature is above two threshold values or below two threshold values.

Figure 3:
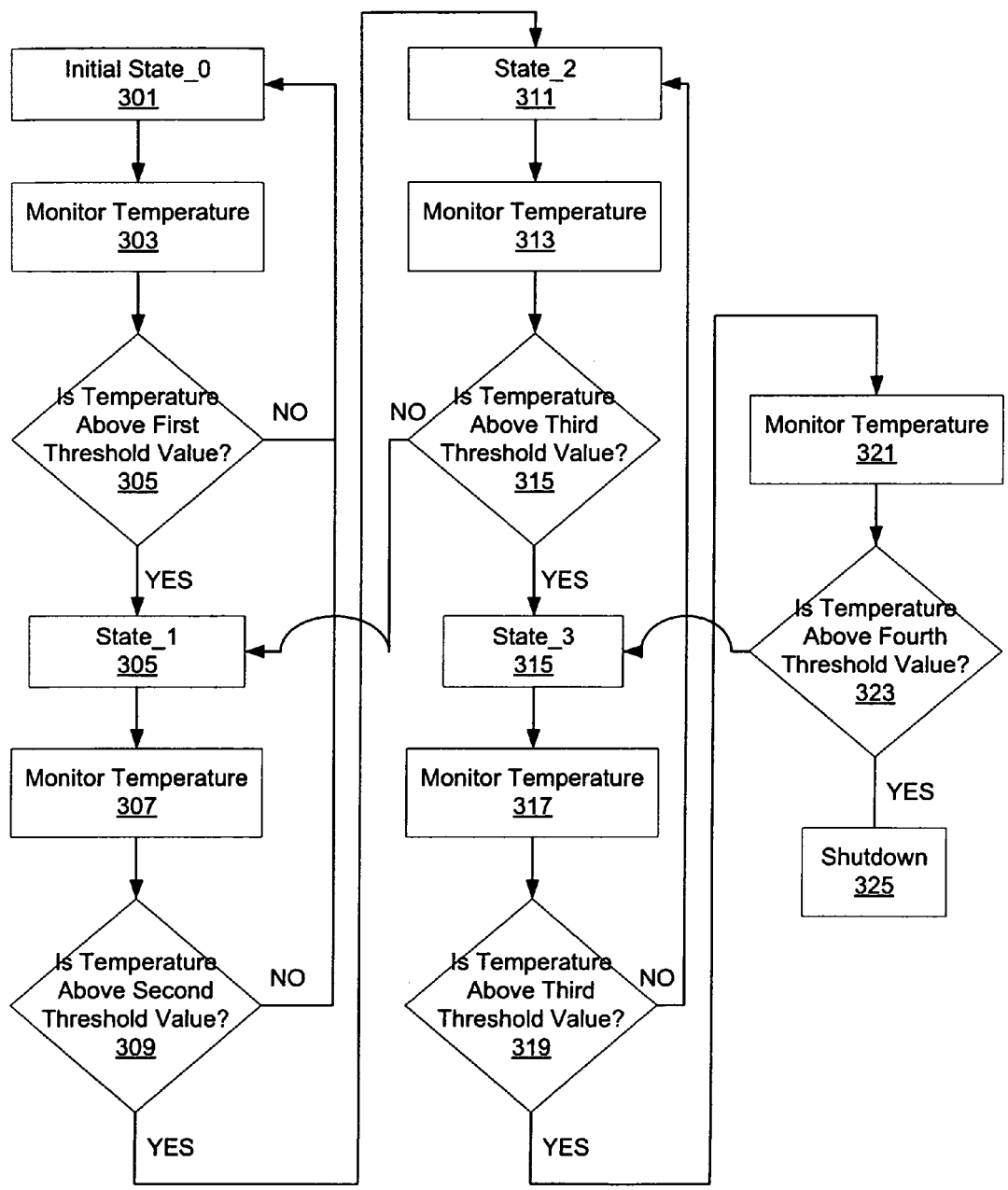
FIG. 3 illustrates a more detailed flow for thermal uncore management according to an embodiment.

FIG. 3 illustrates a more detailed flow for thermal uncore management according to an embodiment. One embodiment of these states used in this flow states has been described in detail in the description of FIG. 1. The uncore is placed in the "initial" state or state_0 at 301. Typically, this is the state that a computing system begins at after boot-up, however, any one of these states may be used as the first state after boot.

The temperature of the uncore is monitored at 303 and a determination of whether the temperature of the uncore is above a first threshold value is made at 305. If the temperature is not above this threshold value, then the uncore will remain in state_0. However, if the temperature of the uncore is above this threshold value, then the uncore state will be changed to state_1 at 305. In state_1, traffic through the uncore throttled or modulated to be less than that of the initial state. For example, the number of credits available to a socket is less in this state than in state_0. By throttling back the traffic, the temperature of the uncore may decrease or increase at a slower rate than it did in the initial state.

While in state_1 the temperature of the uncore is monitored at 307. This temperature value is compared to a second threshold value at 309. This second threshold value is greater than the first threshold value. In other words, the uncore temperature has increased even while in state_1. If the temperature of the uncore is above a second threshold, then the uncore state will be changed to state_2 at 311. State_2 allows less traffic than state_1. For example, the number of credits available to a socket is less in this state than in state_1. If the temperature is not above the threshold value, then the uncore will transition from state_1 back to state_0.

While in state_2, the temperature of the uncore is monitored at 313 and this temperature value is compared to a third threshold value (which is greater than the second threshold value) at 315. If the temperature of the uncore is above the threshold, then the uncore state will be changed to state_3 at 315. State_3 allows less traffic to flow through a socket than state_2. In an embodiment, all activity from a socket or from all sockets is stopped. This stoppage may be modulated off and on periodically. If the temperature is not above the threshold value, then the uncore will transition from state_2 back to state_1.

While in state_3, the temperature of the uncore is monitored at 317 and this temperature value is compared to a fourth threshold value (which is greater than the third threshold value) at 319. If the temperature of the uncore is above the threshold, then the uncore state will be changed to the shutdown state at 323. In the shutdown state, the uncore is temporarily completely shutoff. This is a state of last resort and may be an indication that something serious is wrong with either the uncore or the processing cores are too busy and that this causing to much traffic to be passed through the uncore. If the temperature of the uncore becomes too great, then it may become unstable and transfer inaccurate data. If the temperature is not above the threshold value, then the uncore will transition from state_3 back to state_2.

In an alternative embodiment, the threshold temperatures utilized in the flow above are the same for each state. Of course the number of states may be different for different implementations.

Figure 4:
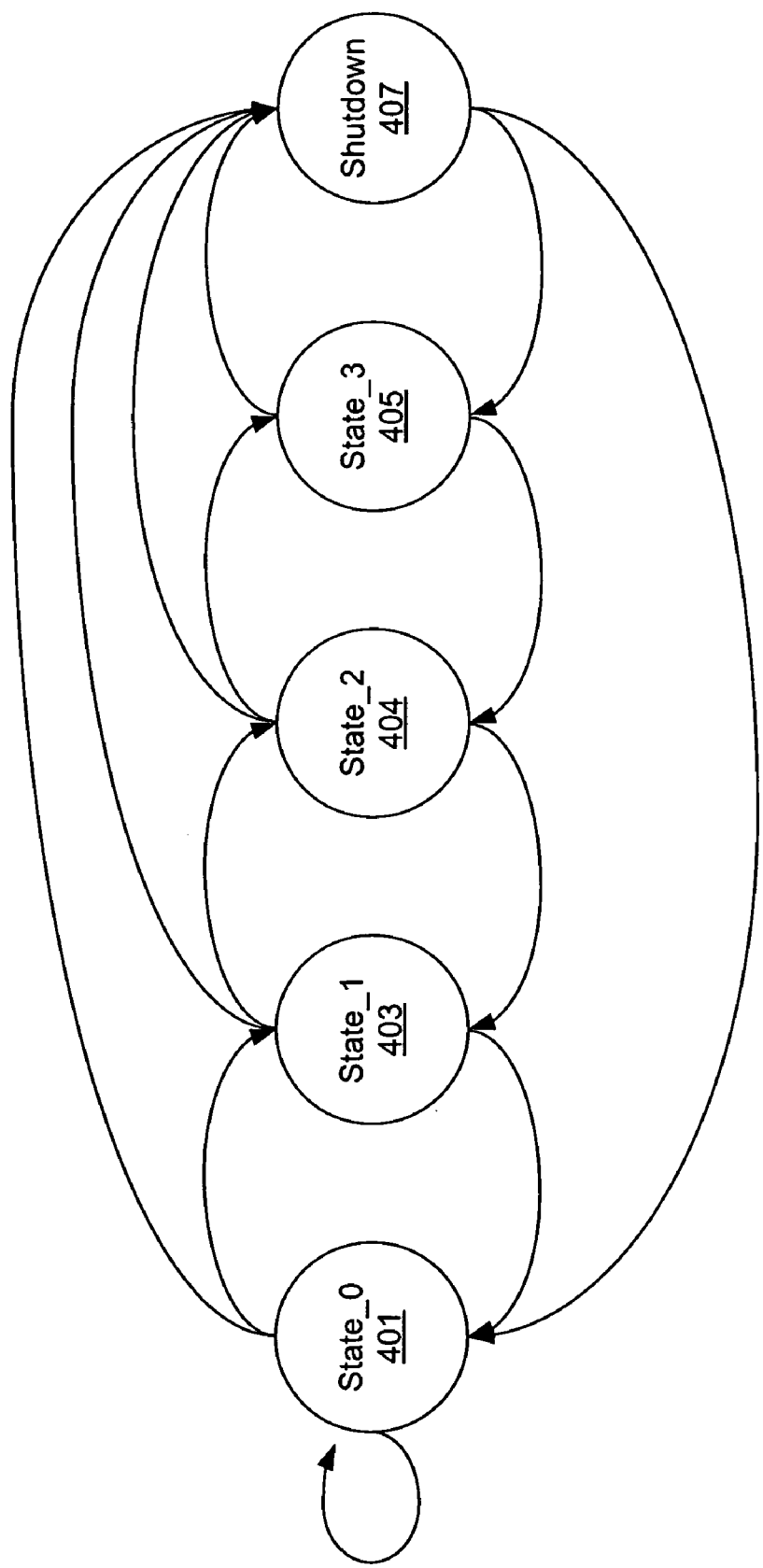
FIG. 4 is a state diagram for uncore thermal management according to one embodiment.

FIG. 4 is a state diagram for uncore thermal management according to one embodiment. While FIG. 4 illustrates five total states, any number of states may be used. The threshold values may be the same or different.

The uncore is initialized to an initial state or state_0 401. The uncore remains in this state 401 so long as its temperature does not go above a first threshold value.

If the temperature of the uncore does go above the first value, the state of the uncore transitions to state_1 403. The state of the uncore returns from state_1 403 to state_0 401 if the uncore temperature drops below the first threshold value.

While in state_1 403, if the temperature of the uncore rises above a second threshold value, the state of the uncore transitions to state_2 404. The state of the uncore returns from state_2 404 to state_1 403 if the uncore temperature drops below the second threshold value.

While in state_2 404, if the temperature of the uncore rises above a third threshold value, the state of the uncore transitions to state_3 405. The state of the uncore returns from state_3 405 to state_2 404 if the uncore temperature drops below the third threshold value.

Finally, while in state_3 405, if the temperature of the uncore rises above a fourth threshold value, the state of the uncore transitions to the shutdown state 406. The state of the uncore returns from the shutdown state 406 to state_3 405 if the uncore temperature drops below the fourth threshold value.

The state of the uncore may also jump from any of the state prior to shutdown (state_0 401, state_1 403, or state_2 404) to the shutdown state. This jump may occur if the temperature of the uncore is greater than any of the threshold values. The state of the uncore may also return to the initial state 401 from the shutdown state 405 instead of stepping back state-by-state.

Using a state machine approach like the one described above, allows for the graceful slowing down of traffic through a network and easing of thermal conditions in a computing system. Under most conditions, the range of states prior to shutdown should suffice to bring the uncore temperature under control. Once the temperature falls below a threshold value more traffic may be allowed to pass through the network.

Embodiments of the invention may be implemented in a variety of electronic devices and logic circuits. Furthermore, devices or circuits that include embodiments of the invention may be included within a variety of computer systems, including a point-to-point (p2p) computer system and shared bus computer systems. Embodiments of the invention may also be included in other computer system topologies and architectures.

Figure 5:
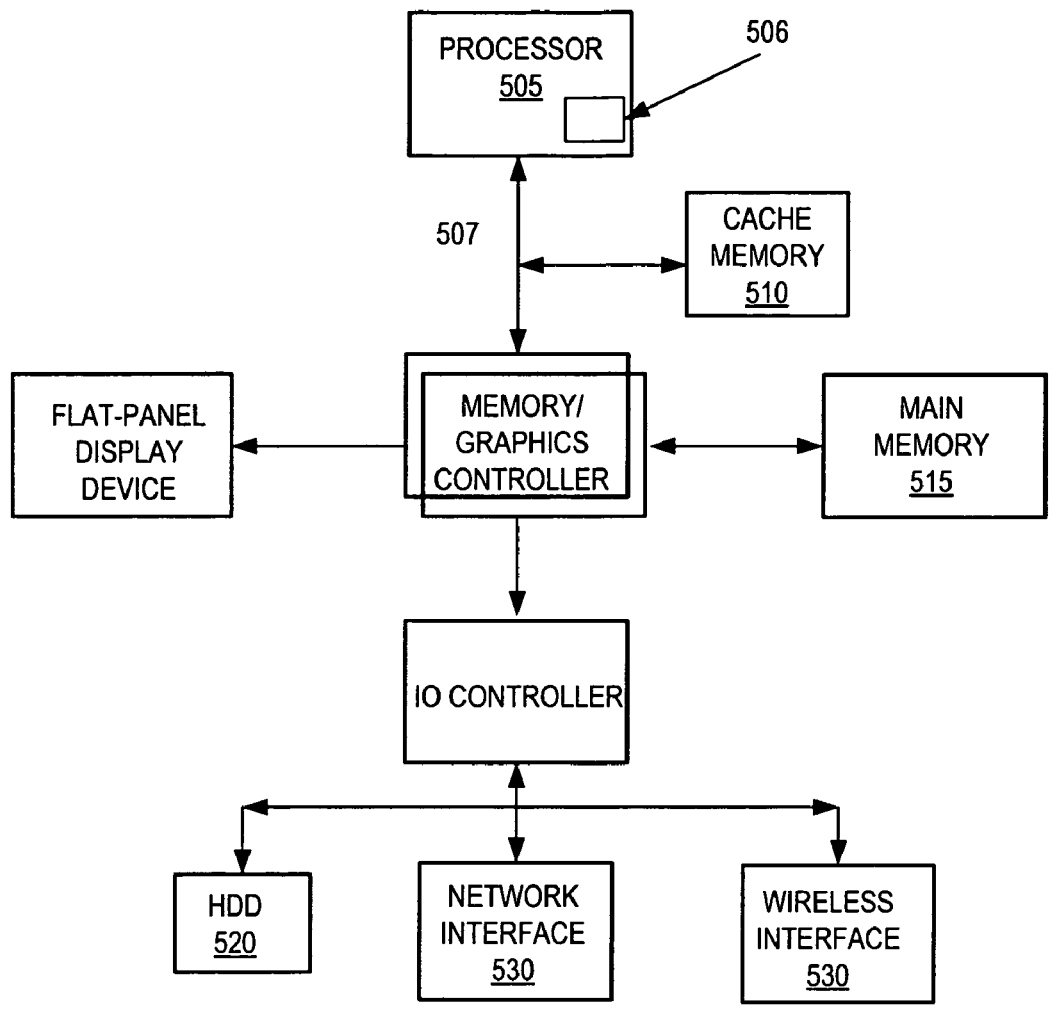
FIG. 5 illustrates a front-side-bus (FSB) computer system in which one embodiment of the invention may be used.

FIG. 5, for example, illustrates a front-side-bus (FSB) computer system in which one embodiment of the invention may be used. A processor 505 accesses data from a level one (L1) cache memory 510 and main memory 515. In other embodiments of the invention, the cache memory may be a level two (L2) cache or other memory within a computer system memory hierarchy. Furthermore, in some embodiments, the computer system of FIG. 5 may contain both a L1 cache and an L2 cache.

Illustrated within the processor of FIG. 5 is one embodiment of the invention 506. The processor may have any number of processing cores. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 520, or a memory source located remotely from the computer system via network interface 530 containing various storage devices and technologies. The cache memory may be located either within the processor or in close proximity to the processor, such as on the processor's local bus 507.

Furthermore, the cache memory may contain relatively fast memory cells, such as a six-transistor (6T) cell, or other memory cell of approximately equal or faster access speed. The computer system of FIG. 5 may be a point-to-point (PtP) network of bus agents, such as microprocessors, that communicate via bus signals dedicated to each agent on the PtP network. Within, or at least associated with, each bus agent may be at least one embodiment of invention 506. Alternatively, an embodiment of the invention may be located or associated with only one of the bus agents of FIG. 5, or in fewer than all of the bus agents of FIG. 5.

Figure 6:
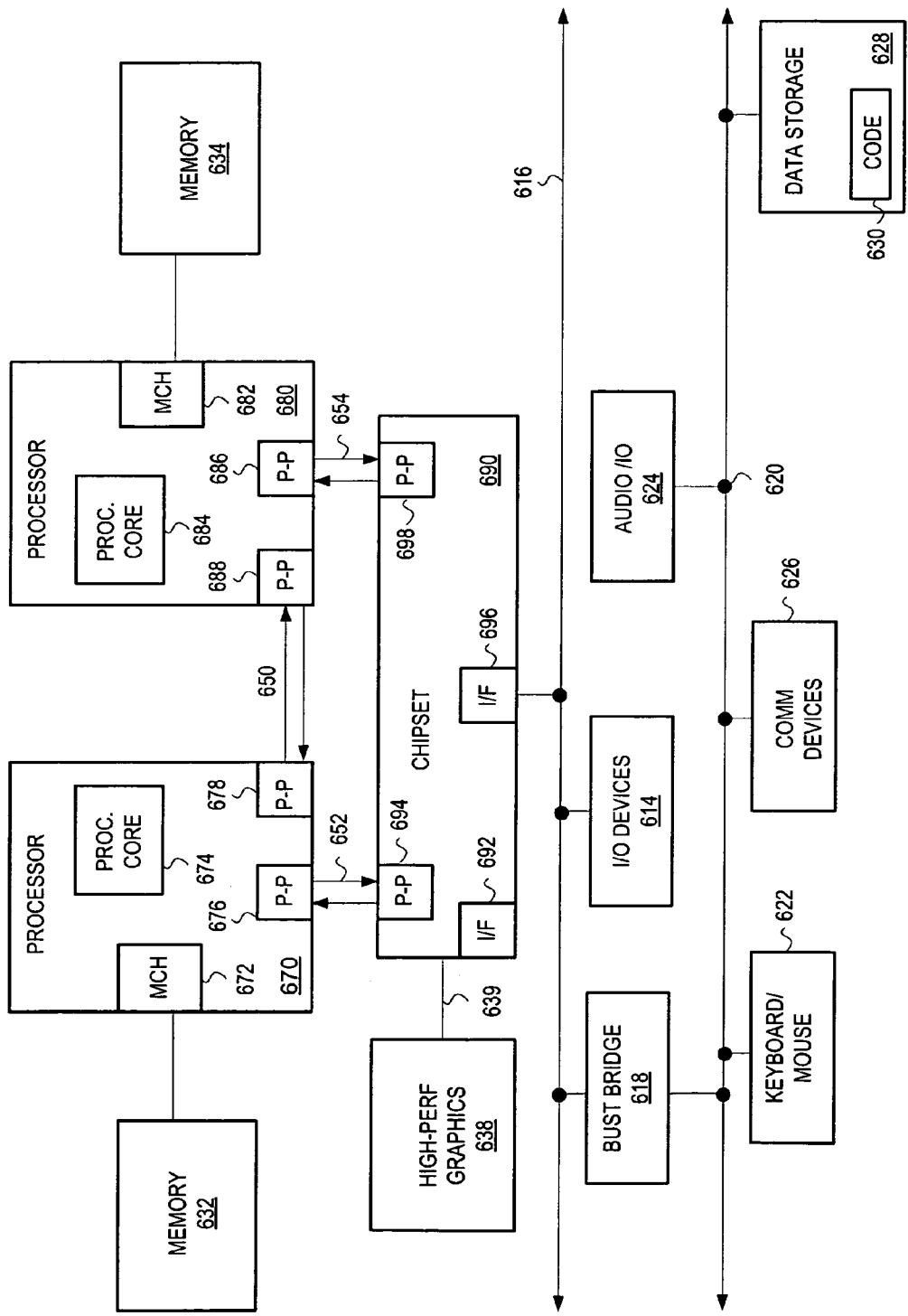
FIG. 6 illustrates a computer system that is arranged in a point-to-point (PtP) configuration.

Similarly, at least one embodiment may be implemented within a point-to-point computer system. FIG. 6, for example, illustrates a computer system that is arranged in a point-to-point (PtP) configuration. In particular, FIG. 3 shows a system where processors, memory, and input/output devices are interconnected by a number of point-to-point interfaces.

The system of FIG. 6 may also include several processors, of which only two, processors 670, 680 are shown for clarity. Processors 670, 680 may each include a local memory controller hub (MCH) 672, 682 to connect with memory 62, 64. Processors 670, 680 may exchange data via a point-to-point (PtP) interface 650 using PtP interface circuits 678, 688. Processors 670, 680 may each exchange data with a chipset 690 via individual PtP interfaces 652, 654 using point to point interface circuits 676, 694, 686, 698. Chipset 690 may also exchange data with a high-performance graphics circuit 638 via a high-performance graphics interface 639. Embodiments of the invention may be located within any processor having any number of processing cores, or within each of the PtP bus agents of FIG. 6.

Other embodiments of the invention, however, may exist in other circuits, logic units, or devices within the system of FIG. 6. Furthermore, in other embodiments of the invention may be distributed throughout several circuits, logic units, or devices illustrated in FIG. 6.

Each device illustrated in FIGS. 5 and 6 may contain multiple cache agents, such as processor cores, that may access memory associated with other cache agents located within other devices within the computer system.

For the sake of illustration, an embodiment of the invention is discussed below that may be implemented in a p2p computer system, such as the one illustrated in FIG. 6. Accordingly, numerous details specific to the operation and implementation of the p2p computer system of FIG. 6 will be discussed in order to provide an adequate understanding of at least one embodiment of the invention. However, other embodiments of the invention may be used in other computer system architectures and topologies, such as the shared-bus system of FIG. 5. Therefore, reference to the p2p computer system of FIG. 6 should not be interpreted as the only computer system environment in which embodiments of the invention may be used. The principles discussed herein with regard to a specific embodiment or embodiments are broadly applicable to a variety of computer system and processing architectures and topologies.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.), or a more specific form of program code that is targeted for a specific processor.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method comprising:
   determining that a first temperature of an uncore of a socket in an initial uncore state is above a first threshold value, wherein in the initial uncore state the socket has a full number of message credits available for its use;
   changing the initial uncore state to a first uncore state based on the first temperature, wherein in the first uncore state the socket has less than the full number of message credits available for its use;
   determining that a second temperature of the uncore of the socket in the first uncore state is above a second threshold value;
   changing the first uncore state to a second uncore state based on the second temperature, wherein in the second state the socket has less than the full number of message credits available for its use;
   determining that a third temperature of the uncore of the socket in the second uncore state is above a third threshold value; and
   changing the second uncore state to a third uncore state based on the third temperature, wherein in the third state all activities to and from the socket are stopped and no message credits are available to the uncore.

2. The method of claim 1, further comprising:
   initializing the uncore to the initial uncore state, wherein the initializing allocates the full number of message credits available for the socket's use.

3. The method of claim 1, further comprising:
   determining that a fourth temperature of the uncore of the socket in the third uncore state is above a fourth threshold value; and
   changing the third uncore state to a fourth uncore state based on the third temperature, wherein in the fourth state power to the uncore is turned off.

4. The method of claim 1, wherein in the first state an amount of traffic is set at one message every N clock cycles.

5. The method of claim 1, wherein in the second state only one credit is available for each message class in the socket.

6. A system comprising:
   a first and second processing cores;
   an uncore to pass traffic between the first and second processing cores;
   a thermal sensor to determine the temperature of the uncore;
   throttling logic to store a state machine to adjust the temperature of the uncore by changing the state of the uncore based on the temperature determined by the thermal sensor; and
   an audio input/output coupled to the processing cores.

7. The system of claim 6, wherein the states of the state machine comprise:
   a first state in which the traffic allowed to pass uncore is maximally buffered; and
   a second state, wherein the amount of traffic allowed to pass through the uncore is less than the first state.

8. The system of claim 7, wherein the state machine further comprises:
   a third state, wherein power is removed to the uncore.

9. The system of claim 6, wherein the uncore comprises:
   a crossbar router coupled to the first and second processing cores.

10. A processor comprising:
    a first and second processing cores;
    an uncore to pass traffic between the first and second processing cores;
    a thermal sensor to determine the temperature of the uncore; and
    throttling logic to store a state machine to adjust the temperature of the uncore by changing the state of the uncore based on the temperature determined by the thermal sensor.

11. The processor of claim 10, wherein the states of the state machine comprise:
    a first state in which the traffic allowed to pass uncore is maximally buffered; and
    a second state, wherein the amount of traffic allowed to pass through the uncore is less than the first state.

12. The processor of claim 11, wherein the state machine further comprises:
    a third state, wherein power is removed to the uncore.

13. The processor or claim 10, wherein the uncore comprises:
    a crossbar router coupled to the first and second processing cores.

* * * * *